United States Patent [19]

Escaron et al.

[11] 4,269,063

[45] May 26, 1981

[54] DOWNHOLE FORCE MEASURING DEVICE

[75] Inventors: Pierre C. Escaron, Houston; Joachim A. Hoppe, Spring, both of Tex.

[73] Assignee: Schlumberger Technology Corporation, Houston, Tex.

[21] Appl. No.: 77,648

[22] Filed: Sep. 21, 1979

[51] Int. Cl.³ .......................................... E21B 47/00
[52] U.S. Cl. ................................. 73/151; 73/862.39
[58] Field of Search ................ 73/143, 141 A, 141 R, 73/151; 177/211

[56] References Cited

U.S. PATENT DOCUMENTS

| 3,327,784 | 6/1967 | Pardue | 166/65 |
| 3,402,601 | 9/1968 | Heineman | 73/143 |
| 3,497,958 | 3/1970 | Gollwitzer | 33/133 |
| 3,567,879 | 3/1971 | Dueker et al. | 200/52 |

OTHER PUBLICATIONS

Advertising Brochure: The CEC 1000 Sputtered Gage Pressure Transducer, CEC Division of Bell and Howell, Pasedena, Calif.

*Primary Examiner*—Jerry W. Myracle

[57] ABSTRACT

An apparatus for measuring the downhole force applied to a cable suspending a well-logging apparatus in a borehole according to the invention is connected between the cable and the well-logging apparatus. An elongated sensitive element has a strain gauge integrally bonded upon it for measuring the downhole force, and the strain gauge includes at least one sputter deposited strain gauge. The apparatus is provided with elements for compensating for pressure and temperature changes in the borehole, wherein an envelope is sealingly disposed about the strain gauge means and is formed to allow the sides of the envelope to deflect inwardly and outwardly from the strain gauge in response to changes in pressure and temperature in the borehole. The envelope is filled with oil.

6 Claims, 6 Drawing Figures

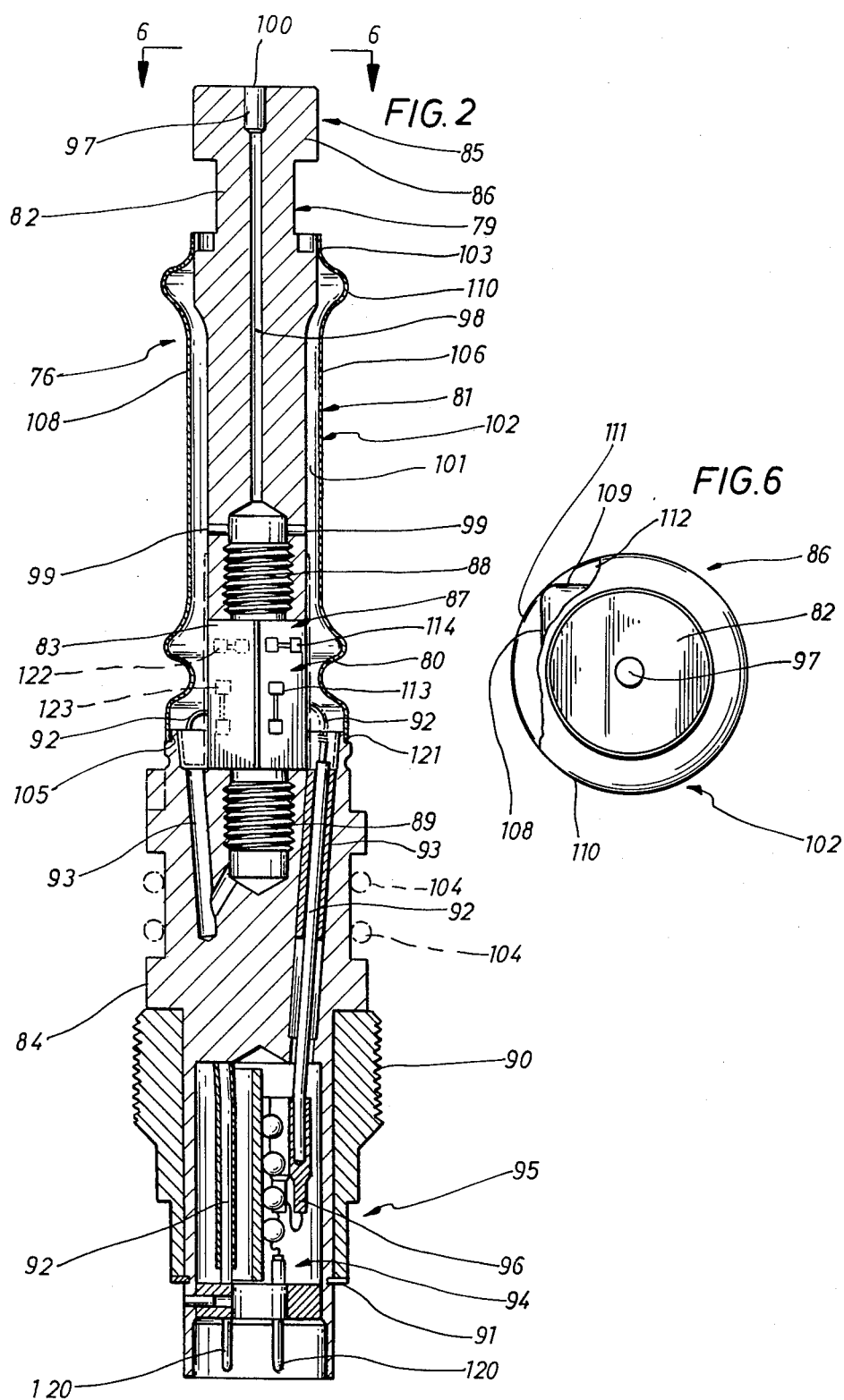

DOWNHOLE FORCE MEASURING DEVICE

BACKGROUND OF THE INVENTION

1. Field of the Invention

The invention relates to an apparatus for measuring the downhole force applied to a cable suspending a well-logging apparatus in a borehole.

2. Description of the Prior Art

To accurately determine the depth of a well-logging tool suspended at the end of a cable in a borehole, it is necessary to measure the displacement of the cable on the surface and to correct the surface displacement measurement by the calculated elongation of the cable. The elongation calculation requires information relating to the surface and downhole tensions applied to the cable. As a first approximation, it is possible to take, as a downhole force, the apparent weight of the apparatus in the column of drilling mud. However, for apparatus equipped with pads or centering devices, or for directionally deviated wells, the downhole force depends greatly upon the friction of the apparatus against the borehole wall. Accordingly, it is desirable to measure the downhole force in situ by means of a cable force measuring device placed between the cable and the well-logging apparatus.

U.S. Pat. No. 3,497,958, issued to Gollwitzer on Mar. 3, 1979, and U.S. Pat. No. 3,402,601, to Heineman, issued on Sept. 24, 1968, illustrate two devices for measuring downhole tension. Gollwitzer describes a method for determining the depth of a well-logging apparatus using a measurement of movement of the cable and the values of the downhole tension of the cable. Gollwitzer also schematically describes a device for downhole tension measurement using strain gauges; however, neither the specific structure of the downhole tension device, nor the means by which the strain gauge elements are mounted is disclosed. The Heineman patent discloses a tension-measuring sensor mounted in an oil-filled enclosure in a downhole tool head. In order to correctly carry out the measurement of downhole tension, Heineman discloses the use of a bellows-type of device for providing pressure and temperature compensation against the difficult temperature and high pressure conditions encountered in the borehole, which can be as high as temperatures of 500° F., and pressures of 25,000 p.s.i. in the drilling mud column.

One of the major problems encountered when attempting to measure the downhole force applied to a cable suspending a well-logging apparatus is that when a bellows-type temperature pressure compensation means is utilized, the drilling mud may become entrapped in the creases of the bellows. As the bellows expands and contracts in relationship to pressure and temperature changes, the drilling mud may prevent the necessary contraction of the bellows, or may cause a failure of the metal bellows by causing it to crack, rip open, or corrode. Another deficiency with the bellows-type pressure and temperature compensation means is that it is inefficient from a space standpoint, in that additional space in the tool head is required for mounting the bellows-type pressure and temperature compensation device.

A major problem encountered when using strain gauge devices in downhole cable tension measuring apparatus is related to the extreme temperature and pressure conditions encountered in the boreholes. Heretofore, strain gauges utilized in downhole cable tension measuring apparatus were able to operate under high temperature or under high pressure conditions; however, when both high temperature and pressure conditions were encountered, the accuracy of the tension measuring device was adversely affected, including unacceptable levels of drift and instability of the strain gauge signals.

Accordingly, prior to the development of the present invention, there has been no downhole cable force measuring apparatus which has satisfactory operating characteristics when operating under extreme temperature and pressure conditions, and which is provided with a space-saving pressure and temperature compensation means whose operation is not adversely affected by coming into contact with the column of drilling mud. Therefore, the art has sought an efficient and accurate downhole cable force measuring apparatus which provides accurate cable force measurements under high temperature and pressure conditions, and is not adversely affected by the column of drilling mud coming into contact with the pressure and temperature compensation means.

SUMMARY OF THE INVENTION

In accordance with the invention for foregoing has been achieved through the present apparatus for measuring the downhole forces applied to a cable suspending a well-logging apparatus in a borehole. The apparatus of the present invention comprises an elongated sensitive element adapted to be connected between the cable and the well-logging apparatus to deform elastically under the effect of the downhole force; strain gauge means integrally bonded upon the sensitive element for measuring the downhole force; wherein the strain gauge means includes at least one sputter deposited strain gauge; and means for compensating for pressure and temperature changes in the borehole, including an elongated envelope, having at least three sides, sealingly disposed about the strain gauge means and formed to allow said sides to deflect inwardly and outwardly from said strain gauge means in response to changes in pressure and temperature, the envelope being filled with oil.

As indicated above, in more specific terms, the apparatus of the present invention may include the use of at least two pairs of sputter deposited strain gauges, the pairs being disposed on opposite surfaces of the sensitive element.

A feature of the present invention resides in the fact that at least one of the sides of the envelope may be formed with a plurality of grooves which are substantially parallel with the longitudinal axis of the envelope to allow said sides to deflect inwardly and outwardly in response to changes in pressure and temperature, and further that the envelope may be formed with at least one groove which is substantially perpendicular to the longitudinal axis of the envelope to allow the envelope to expand and contract along the longitudinal axis of the envelope in response to changes in the length of the sensitive element caused by the downhole force.

The apparatus for measuring downhole force applied to a cable suspending a well-logging apparatus in a borehole of the present invention, when compared with previously proposed prior art downhole tension measurement devices has the advantages of compactness, durability, and accuracy under a wide range of temperature and pressure conditions.

BRIEF DESCRIPTION OF THE DRAWINGS

In the drawings:

FIG. 2 is a partial cross-sectional view along the longitudinal axis of an apparatus for measuring the downhole force applied to a cable suspending well-logging apparatus in a borehole in accordance with the present invention;

FIG. 6 is a top view of a downhole force measurement device in accordance with the present invention taken along line 6—6 of FIG. 2, with a portion of a component part removed for clarity.

While the invention will be described in connection with the preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
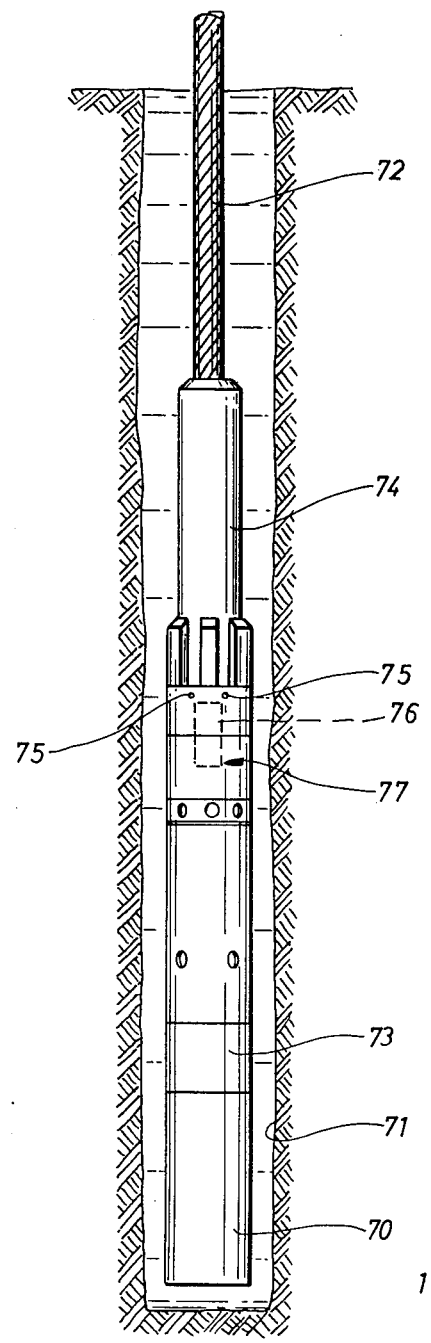
FIG. 1 is a diagram of a device according to the invention illustrated in operation in a borehole.

In FIG. 1, a well-logging apparatus 70 is suspended in a borehole 71 at the end of a single or multiconductor cable 72 which runs to the surface and passes over pulleys (not shown) to a surface winch (not shown) allowing well-logging apparatus 70 to be moved along borehole 71. The well-logging apparatus 70 comprises, at its top, a transmission section 73 adapted to transmit to the surface, on the conductors of the cable 72, meaurement signals detected by means of sensors in the well-logging apparatus 70.

Still referring to FIG. 1, it is seen that between the well-logging apparatus 70 and cable 72 is a logging equipment head 74 which is provided with suitable, and conventional, circuitry to allow the transmission of the measurement signals detected by means of the sensors in well-logging apparatus 70 to cable 72, and thus to the surface. Logging equipment head 74 is provided with suitable ports 75 to allow entry of the drilling mud (not shown) which is in borehole 71 to enter into a portion of the interior of logging equipment head 74. The apparatus 76 of the present invention for measuring the downhole force applied to the cable 72 suspending well-logging apparatus 70 in borehole 71 is centrally disposed within logging equipment head 74 at the general location indicated by dotted lines 77.

Turning now to FIG. 2, the downhole force measuring apparatus 76 of the present invention is shown. Force measuring apparatus 76 includes: an elongated sensitive element 79 adapted to be connected between cable 72 and well-logging apparatus 70; strain gauge means 80 integrally bonded upon the sensitive element 79; and means 81 for compensating for pressure and temperature changes in borehole 71.

Still referring to FIG. 2, the basic components of force measuring apparatus 76 will be described in greater detail. Elongated sensitive element 79, which will deform elastically under the effects of the downhole force, includes an upper bulkhead 82, force beam 83, and lower bulkhead 84. Upper bulkhead 82 at its upper end 85 is adapted for being operatively connected to cable 72 via conventional components (not shown) contained in logging equipment head 74. At the lower end 87 of upper bulkhead 82 a threaded connection 88 is provided to secure force beam 83 and upper bulkhead 82. Likewise, there is a threaded connection 89 between force beam 83 and lower bulkhead 84. Rotatably and slidably mounted about lower bulkhead 84 is a threaded sleeve 90 which is secured to lower bulkhead 84 by means of a slotted washer 91. Threaded sleeve 90 serves to secure the force measuring apparatus 76 within logging equipment head 74.

Contained within lower bulkhead 84 are suitable, conventional electrical connections and components for allowing the transmission of the signals generated by strain gauge means 80 to the surface. These components include suitable leads 92 in electrical association with strain gauge means 80, and the leads 92 pass through conduits 93 in lower bulkhead 84. The various electrical leads 92 pass through conduits 93 into a chamber 94 formed in the lower end 95 of lower bulkhead 84. Electrical leads 92 and their associated, conventional electrical components, shown generally at 96, then pass through chamber 94 in the lower end 95 of lower bulkhead 84 to engage a plurality of conventional plug pin connectors 120. Plug pin connectors 120 are adapted to interface with the signal transmission equipment in transmission section 73.

Still referring to FIG. 2, it is seen that at the upper end 85 of upper bulkhead 82 of elongated sensitive element 79 is formed on orifice 97 and a passageway 98 which communicate with exit ports 99. Orifice 97 is provided with a suitable plug 100 for sealing orifice 97. Orifice 97 is used to allow oil to be placed in a chamber formed between the outer surfaces of upper bulkhead 82 and force beam 83, and the inner surface of pressure and temperature compensating means 81, as will be hereinafter described in more detail.

Pressure and temperature compensating means 81 is shown to comprise an elongated envelope 102 which is sealingly disposed about strain gauge means 80. The upper end 103 of envelope 102 is sealed about upper bulkhead 82 by means of welding, or other suitable means, and the lower end 121 of envelope 102 is welded about a circumferential groove 105 formed on lower bulkhead 84. Thus, it is seen that a chamber 101 is formed between the inner surface of envelope 102 and the outer surfaces of upper bulkhead 82 and force beam 83. Chamber 101, as previously described, may then be filled with a suitable oil by means of orifice 97, passageway 98, and outlet ports 99 which are formed in upper bulkhead 82.

Since logging equipment head 74 is provided with ports 75 as shown in FIG. 1, the drilling mud in borehole 71 is allowed to enter the interior of logging equipment head 74, whereby the drilling mud comes into contact with the outer surface of envelope 102. Accordingly, the oil contained within chamber 101 is maintained at the hydrostatic pressure of the drilling mud in the borehole by pressure and temperature compensation means 81 as will be hereinafter described in more detail. In this regard it should be noted that lower bulkhead 84 is provided with a plurality of O-rings 104 which provide a seal against the drilling mud from entering into other portions of logging equipment head 74 and transmission section 73, where the entry of the drilling mud is not desired.

Figure 3:
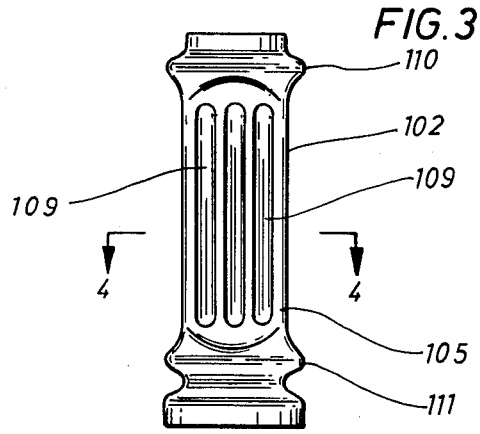
FIG. 3 is a side view of a portion of the downhole force measuring device of the present invention.
Figure 4:
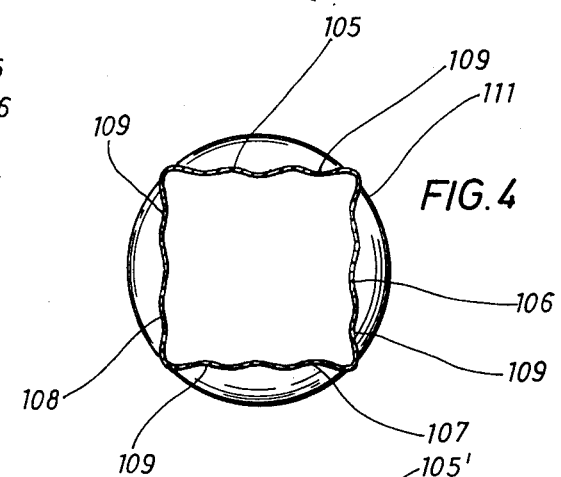
FIG. 4 is a cross-sectional view of one embodiment of the pressure and temperature compensating means of the present invention, taken along line 4—4 of FIG. 3.

With reference to FIGS. 2, 3, and 4, envelope 102 is shown to include four sides 105–108 which are formed to allow the sides 105–108 to deflect inwardly and outwardly from strain gauge means 80 in response to changes in pressure and temperature of the drilling mud in borehole 71. In this regard, at least one of the sides 105–108 of envelope 102, and preferably all four sides 105–108 of envelope 102, are formed with a plurality of grooves 109 which are substantially parallel to the longitudinal axis of envelope 102. Grooves 109 allow sides 105–108 to deflect inwardly or outwardly from strain gauge means 80 in response to changes in pressure and temperature of the drilling mud in borehole 71. Grooves 109 provide the requisite flexibility in envelope 102 to allow sides 105–108 to be deflected inwardly in response to increased pressures or decreased temperatures in borehole 71, and conversely to expand or deflect outwardly in response to decreased pressures or increased temperatures in borehole 71.

Envelope 102 is also provided with at least one groove 110, and preferably an additionally groove 111 disposed adjacent the ends of enevelope 102. Grooves 110 and 111 are substantially perpendicular to the longitudinal axis of envelope 102 to allow envelope 102 to expand or contract along the longitudinal axis of envelope 102 in response to changes in the length of the elongated sensitive element 79, to which envelope 102 is secured, as the length of elongated sensitive element 79 changes in response to the downhole force exerted upon it. As shown in FIGS. 2 and 3, grooves 110 and 111 are formed on envelope 102, such that they are concave when viewed with respect to the interior surface of envelope 102, which forms chamber 101, or alternatively, grooves 110 and 111 are convex when viewed from the exterior of envelope 102. It should of course be noted that this relationship could be readily reversed.

Figure 5:
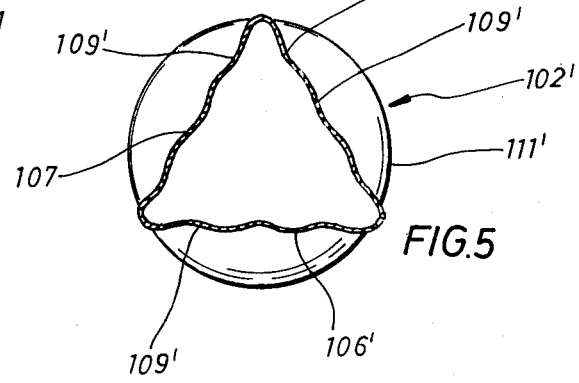
FIG. 5 is another cross-sectional view of a pressure and temperature compensating means in accordance with the present invention.

Turning now to FIG. 5, another embodiment of the pressure and temperature compensating means 81, or envelope 102' is shown. In this embodiment, envelope 102' has only three sides 105'–107', and at least one side 105'–107' has a plurality of grooves 109' which are substantially parallel with the longitudinal axis of envelope 102' to allow sides 105'–107' to deflect inwardly and outwardly in response to changes in pressure and temperature. Preferably each side 105'–107' has grooves 109 formed therein. As in the embodiment of envelope 102 shown in FIG. 4, envelope 102' is also provided with at least one groove 111' which is substantially perpendicular to the longitudinal axis of envelope 102' to allow it to expand and contract along the longitudinal axis of envelope 102' in response to changes in the length of the elongated sensitive element 79, which changes are caused by the downhole force being measured. Preferably, as in the embodiment of FIG. 4, envelope 102' would be provided with an additional groove (not shown) which is also substantially perpendicular to the longitudinal axis of envelope 102'. As in the embodiment of FIG. 4, the two grooves which are substantially perpendicular to the longitudinal axis of envelope 102' are disposed adjacent the ends of envelope 102'.

Inasmuch as envelopes 102 and 102' come into contact with the drilling mud found in borehole 71, as well as being exposed to extremely high temperature conditions, envelopes 102 and 102' must be made of a corrosion-resistant metal. One example of a material to use for the manufacture of envelopes 102 and 102' is an alloy known as Inconel X750. Additionally, the necessity of the grooves 109 and 190' of envelopes 102 and 102' to be flexible enough to allow for the necessary inward and outward deflection, as well as expansion and contraction of grooves 110, 111 and 111' along the longitudinal axis of elongated sensitive element 79, requires that the thickness of the metal used to manufacture envelopes 102 and 102' be relatively thin. Accordingly, the thickness of the material used to make envelopes 102 and 102' should be within the range of 0.002 inch to 0.01 inch, and preferably of a thickness within the range of 0.005 inch to 0.008 inch; however, the thickness of the material within the foregoing ranges is not critical to the successful operation of the envelopes 102 and 102' of pressure and temperature compensating means 81. Although two embodiments of envelope 102 and 102' have been disclosed in FIGS. 4 and 5, it should be understood that envelope 102 should have at least three sides, and preferably four sides. However, it should be readily understood that five or more sides would also provide satisfactory operating characteristics of the pressure and temperature compensating means 81, or envelope 102.

Turning now to FIG. 6, another view of the downhole force measuring apparatus 76 of the present invention is shown, wherein orifice 97 to be used for filling chamber 101 with oil, is shown to be centrally disposed at the upper end 85 of the upper bulkhead 82. A portion of envelope 102 has been broken away along line 112, thus illustrating the disposition of grooves 110 and 111 of envelope 102, as well as sides 108 and 109 of envelope 102. Viewing envelope 102 with reference to FIGS. 3-6 it is seen that the pressure and temperature compensating means 81, or envelope 102 of the present invention does not have any surfaces upon which the drilling mud could collect and thus hinder the operation of envelope 102 as it deflects inwardly and outwardly from strain gauge means 80, or as envelope 102 expands and contracts along the longitudinal axis of elongated sensitive member 79 in response to changes in the length of member 79 which are caused by the downhole force, as is the case in the bellows-type of pressure and temperature compensation means previously discussed.

Returning now to FIG. 2, the strain gauge means 80 of the present invention will be described in further detail. Strain gauge means 80 comprises at least one sputter deposited strain gauge 113 which is sputter deposited upon force beam 83, and is thus in contact with the oil in chamber 101. Preferably, strain gauge means 80 comprises two pairs of sputter deposited strain gauges, one pair consisting of strain gauges 113 and 114 and the other pair of strain gauges 122 and 123 being disposed on the opposite surface of force beam 83. The other pair of strain gauges 122 and 123 are a mirror image of the pair of strain gauges 113 and 114. In this regard, force beam 83 preferably has a square cross-sectional configuration with the pairs of strain gauges being integrally bonded upon opposite sides of force beam 83. The term "sputter deposited" is used to indicate that the strain gauges are integrally bonded upon force beam 83 by means of a vacuum-deposition technique, wherein the metallic surface of force beam 83 upon which the strain gauges 80 are integrally bonded is first highly polished, and subsequently has the strain gauges 80 integrally bonded to the surface of force beam 83 by RF sputtering performed in a vacuum environment. Conventional circuitry (not shown) is utilized in connection with strain gauge means 80 in order to correlate the signals from the strain gauges to provide the measurement of the downhole force.

It is to be understood that the invention is not limited to the exact details of construction, operation, or exact materials or embodiment shown and described as obvious modifications and equivalents will be apparent to one skilled in the art, and the invention is therefore to be limited only by the scope of the appended claims.

What is claimed is:

1. An apparatus for measuring the downhole force applied to a cable suspending a well-logging apparatus in a borehole, comprising:
   (a) an elongated sensitive element adapted to be connected between the cable and the well-logging apparatus to deform elastically under the effect of the downhole tension;
   (b) strain gauge means integrally bonded upon the sensitive element for measuring the downhole force, wherein said strain gauge means includes at least one sputter deposited strain gauge; and
   (c) means for compensating for pressure and temperature changes in the borehole, including an elongated envelope, having at least three sides, sealingly disposed about the strain gauge means and formed to allow said sides to deflect inwardly and outwardly from said strain gauge means in response to changes in pressure and temperature, said envelope being filled with oil.

2. The apparatus of claim 1 wherein the strain gauge means comprises at least two pairs of sputter deposited strain gauges, said pairs disposed on opposite surfaces of said sensitive element.

3. The apparatus of claim 1 wherein at least one of the sides of the envelope is formed with a plurality of grooves which are substantially parallel with the longitudinal axis of the envelope to allow said side to deflect inwardly and outwardly in response to changes in pressure and temperature.

4. The apparatus of claim 3 wherein the envelope is formed with at least one groove which is substantially perpendicular to the longitudinal axis of the envelope to allow the envelope to expand and contract along the longitudinal axis of the envelope in response to changes in the length of the sensitive element caused by the downhole force.

5. The apparatus of claim 4 wherein the envelope is formed with two grooves which are substantially perpendicular to the longitudinal axis of the envelope, said grooves disposed adjacent the ends of the envelope.

6. The apparatus of claim 3 wherein the envelope has four sides and each side is formed with a plurality of grooves which are substantially parallel to the longitudinal axis of the envelope.

* * * * *